Dec. 26, 1939.　　　　L. A. DILS　　　　2,185,053

PROCESS AND COMPOSITION FOR TREATING FOOD MATERIALS

Filed Aug. 20, 1937　　　3 Sheets-Sheet 1

Inventor
Logan A. Dils.
By N. D. Parker Jr.
Attorney

Dec. 26, 1939. L. A. DILS 2,185,053
PROCESS AND COMPOSITION FOR TREATING FOOD MATERIALS
Filed Aug. 20, 1937 3 Sheets-Sheet 2
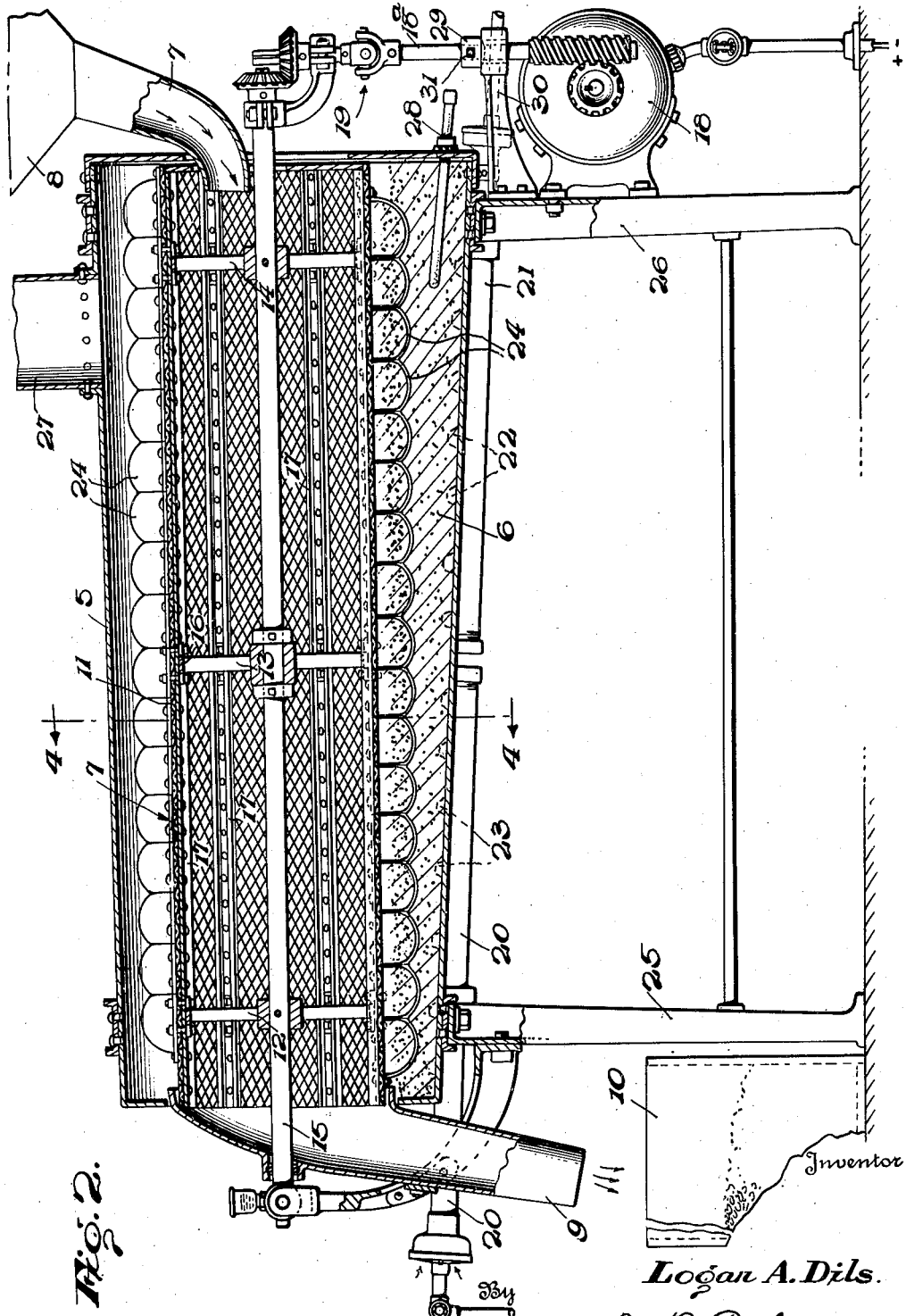
Inventor
Logan A. Dils.
N. D. Parker Jr. Attorney Inventor
Logan A. Dils.
By N. D. Parker Jr.
Attorney

Patented Dec. 26, 1939

2,185,053

UNITED STATES PATENT OFFICE

2,185,053

PROCESS AND COMPOSITION FOR TREATING FOOD MATERIALS

Logan A. Dils, Stuttgart, Ark., assignor, by mesne assignments, of nine-twentieths to Robert M. Foster, Helena, Ark., one-half to H. S. Cramer, New York, N. Y., and one-twentieth to Douglas McCabe, Chicago, Ill.

Application August 20, 1937, Serial No. 160,074

15 Claims. (Cl. 99—80)

This invention relates to a machine and process for treating cereal grains and other food materials.

It has heretofore been proposed to treat cereal grains and other food materials by various processes in order to produce different types and forms of food products. Especially in the so-called cereal art have there been proposed a variety of methods for cooking and otherwise preparing and treating the various cereal grains, with the end in view of producing a palatable and nutritious product which may be of the ready-to-eat type or in the form requiring subsequent treatment by the purchaser before consumption. For the most part, however, the processes heretofore utilized have involved methods of cooking or otherwise subjecting the cereal grains and other food materials to heat, which have necessitated the use of steam or liquids raised to a high temperature. Such practices have resulted in the removal of a portion of the nutritive value of the food material so that the resultant product does not possess the food value which would otherwise be present if the use of steam or hot liquids could be avoided. Moreover, in the methods of cooking or heat-treating heretofore utilized, a considerable time interval has been required to process the food material in the manner desired so that large and expensive installations have been necessary in order to produce a substantial output of the finished product.

It is accordingly one of the objects of the present invention to provide a means and method for treating cereal grains and other food materials which will avoid the aforementioned and other disadvantages.

Another object of the invention is to provide a process for treating cereal grains which will yield a pre-cooked dry product, containing all of the nutritive and beneficial qualities inherent in the original grain.

Still another object is to provide a process for pre-cooking or treating cereal grains without the use of moisture other than that originally contained within the grain.

A further object is to provide a novel process for treating cereal grains which will yield a dry, wholesome and nutritious product, and in which the free starch has been dextrinized, thus producing a pre-digested food of high calorific value.

Another object is to provide a means and method for quick-cooking cereal grains and other food materials wherein the heat employed is dry and of a relatively high temperature and is evenly imparted to the material in such a manner as to cook the same in a comparatively short interval of time.

Still another object is to provide a novel mechanism for performing the initial quick-cooking step of the novel process disclosed herein whereby the material treated will be continuously subjected to a dry even heat ranging from 450°–575° F. for a relatively short interval of time.

Another object is to provide a mechanism of the foregoing character which shall be constituted in such a manner as to continuously subject the material to the action of a dry mixture heated to a substantially high temperature, the mechanism comprising relatively few parts and being capable of economical manufacture.

A further object is to provide a novel, quick-cooking treatment for cereal grains and other food materials utilizing a mixture of dry chemical compounds so constituted as to not only efficiently cook the material in a dry condition, but to impart thereto a preserving quality whereby the treated product may be kept indefinitely without deterioration.

A further object is to provide a novel dry mixture of chemical compounds especially adaptable for use in connection with the foregoing process, the mixture having the quality of withstanding a relatively high heat and further being capable of imparting a preserving quality to the material to be treated.

A further object is to provide a novel mechanism and process for treating cereal grains and other food materials wherein the treatment of the same may be effected in a relatively short period of time and without the use of large and expensive equipment, and wherein the product resulting from the treatment will contain substantially all of the desirable vitamins, minerals, proteins and other food qualities and values originally present in the food material.

A still further object resides in the provision of a novel process for treating certain types of the cereal grains such as unhulled rough rice in order to pop the grains to a size approximating twelve times the original size of the grain, and thus produce a product having an exceptionally high vitamin value and one which is exceedingly palatable and wholesome.

Other objects and novel features of the invention will be more readily understood from a consideration of the following detailed description when taken in connection with the accompanying drawings illustrating one form of mechanism which may be employed and illustrating also the various steps utilized in practicing the novel process disclosed herein. It is to be expressly understood, however, that the drawings are utilized for purposes of illustration only and are not designed as a definition of the limits of the invention, reference being had for this purpose to the appended claims.

In the drawings, wherein similar reference characters refer to similar parts throughout the several views:

Fig. 2 is a side view partly in section of an agitating type of cooker which may be employed in practicing the process;

Figure 1:
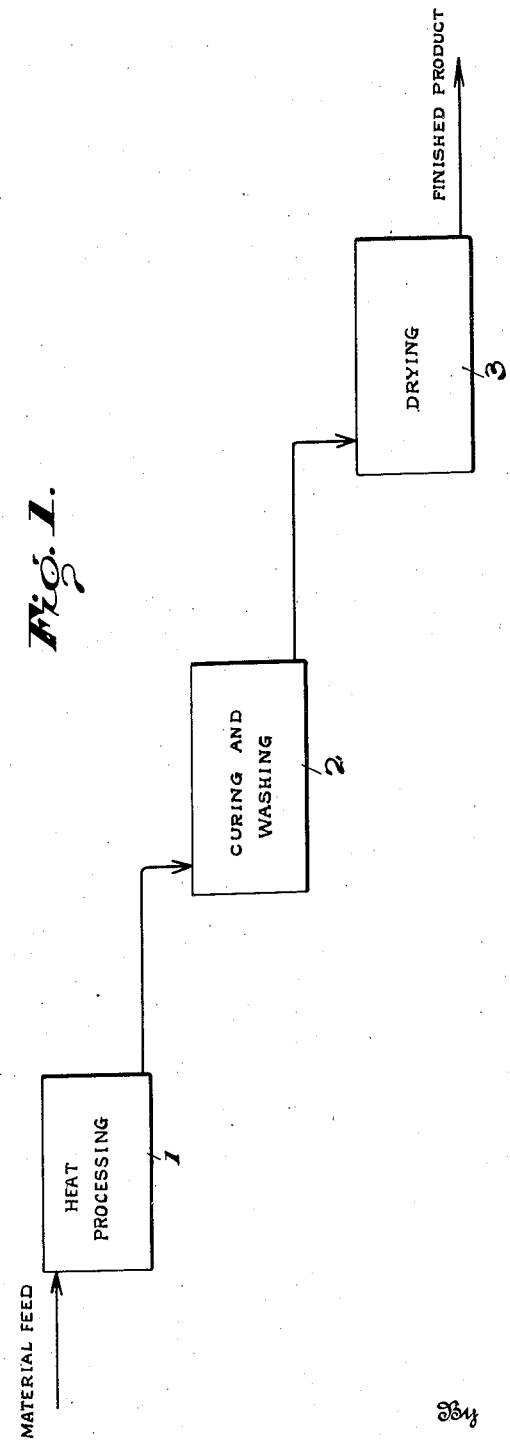
Fig. 1 is a diagrammatic view of the various steps constituting the process of treating cereal grains and other food materials in accordance with the present invention.

The present invention in its broadest aspect resides in the quick-cooking or processing of cereal grains, legumes, vegetables and other food materials by the intimate association therewith of a dry mixture of chemical compounds heated to a relatively high temperature, for example, of the order of 450°–575° F., the processing operation taking place in a comparatively short time interval of from thirty to ninety seconds or more, depending upon the nature of the material to be treated. While the initial step of the process is combined with other steps to treat cereal grains in accordance with the present invention, as will appear more fully hereinafter, such initial step may be utilized separately from the complete process for the purpose of treating and quick-cooking cereal grains, legumes, vegetables and other food materials such as, for example, green coffee berries, tapioca, macaroni, spaghetti, etc. In all of these cases it is found that the quick-cooking process produces a dry product in which are retained all of the beneficial food values originally contained within the material. In the case of green coffee, complete roasting is effected in substantially three minutes without the loss of any of the natural oils, sugars, or flavoring ingredients, while in the instance of starch products such as macaroni, spaghetti, etc., the dry processed product may be thereafter cooked for a period of time approximating three to five minutes whereby the same will be completely cooked and ready for consumption. In the case of certain of the cereal grains as for example, unhulled rough rice, it has been found that the same may be readily popped to a size approximately twelve times the original size of the grain by subjecting the rice to the initial step of the process described in detail hereinafter. The product thus obtained is fluffy and white and has adhered thereto in small split-apart, light brown sections, the outer brown coating and the aleurone layer of the grain which contains substantially all of the valuable vitamins, mineral salts and other nutritious properties for which natural brown rice is well known.

In its specific aspect, the present invention comprehends the treatment of cereal grains by a series of steps in addition to the quick-cooking or processing step mentioned above, whereby a dry, flaked, quick-cooking product will be obtained and which will contain all of the valuable vitamins, minerals, oils and other nutritious food values originally contained in the grain. The product is dry, crispy and flaked, and constitutes a delicious food in combination with warm milk, for example. On the other hand, the product may be boiled in water for from three to five minutes, and in the case of certain of the cereals such as, for example, natural brown rice, the resultant material is a thoroughly cooked natural rice, rich in vitamins, and other food value content, dextrinized as to starch content, thus being capable of ready digestion and having a delicious and pleasing flavor.

Referring more particularly to Fig. 1 wherein the various steps of the process are outlined in diagrammatic form, the cereal grains, such as natural brown rice for example, are heat-processed at 1 by continuously agitating the grains with a dry mixture of chemical compounds, preferably granular in form for ease in initially mixing and subsequent handling. Prior to and during the heat treatment of the grains, the dry mixture is heated to a temperature of the order of 450°–575° F., depending upon the type of the grains, the moisture content thereof, as well as the atmospheric conditions, and during the treatment, the dry mixture is continuously agitated with the grains so that the same intimately surrounds each grain and evenly heats the latter on all sides thereof. Preferably the agitation of the dry mixture and grains is such that a fresh supply of the heating medium is conducted to and over the grains, the agitation effecting a continuous sifting or dispersing of the granular material through the grains so that the material is returned to the original supply and maintained at the temperature stated above. Thus, it will be understood that while the grains are agitated, a continuous supply of the heated mixture is sifted therethrough, thoroughly mixed with the grains in commingled relation in order to impart heat thereto, and is returned to the source. The high heat thus imparted to the grains on all sides thereof rapidly converts the moisture contained therewithin to steam, which in escaping from the interior of the grain through the outer coating, serves to weaken the latter and effects a cracking or splitting of the same. This steam passes off into the atmosphere, it being pointed out that the entire heat-treating processing step is conducted at atmospheric pressure. In view of the high temperature quickly imparted to the grains, substantially the entire content of free starch is dextrinized while the oils are oxidized and thus conditioned beyond the rancidity point whereby the preserving qualities of the product are greatly enhanced.

In producing the popped rice product heretofore mentioned, the natural rough rice is heat-processed, as above stated, in its unhulled condition and containing no more than its natural moisture content. In practice, it has been found that the steam quickly generated within the hulls during the aforementioned processing serves to pop the grains to a relatively large size, the time required to effect popping of a supply undergoing treatment ranging from thirty to ninety seconds, depending upon the temperature of the dry heat-transferring medium.

The composition of the mixture utilized in the heat-processing described above may be such that 100 parts by weight is constituted substantially as follows:

| | |
|---|---|
| Sodium chloride anhydrous | 91.50 to 82.50 |
| Potassium chloride anhydrous | 3.00 to 5.00 |
| Calcium chloride anhydrous | 2.00 to 3.50 |
| Calcium phosphate tribasic | 1.00 to 2.00 |
| Ferrous sulphate (grayish-white) | .50 to 1.00 |
| Lithium chloride | .50 to 1.00 |
| Calcium carbonate | .50 to 3.00 |
| Magnesium carbonate | 1.00 to 2.00 |

Each of the aforementioned ingredients is preferably in granular form in order to facilitate the initial mixing and for ease in handling the mixture during its use. Moreover, the melting point of each constituent is of a sufficiently high order so that the mixture is indestructible at such temperatures as are used in the process. The mixture hence may be utilized over and over again for treating successive batches of cereal grains and the like. In initially mixing the ingredients, a small percentage of magnesium carbonate is utilized in order to prevent the mixture from becoming lumpy due to the absorption of atmospheric moisture. Upon initially heating the mixture, the magnesium carbonate burns off but its absence thereafter will not prevent the recurring use of the mixture, even should the latter be cooled and utilized again.

It will be observed from the above that the basic salts form the greater part of the mixture, sodium and potassium chloride being preferred because of their preservative qualities. Preferably, these chlorides should be of the anhydrous form in order to eliminate the troublesome effects of moisture in initially mixing the ingredients. The calcium chloride content, above indicated, is sufficient, under substantially all atmospheric conditions met in practice to serve as a drying agent to prevent the mixture from becoming caked or lumpy, although it will be understood that the proportion may be varied in accordance with existing atmospheric moisture conditions. The calcium phosphate tribasic serves as a clarifying and neutralizing agent and also possesses the characteristic of balancing the color of the material such as a batch of rice grains or other cereal grains. In addition to the basic chlorides above mentioned, a small amount of ferrous sulphate, grayish-white, is preferably added as a preservative and purifier, this amount having been found to be sufficient to purify and preserve any substance being treated which may border on perishability. The lithium chloride reduces and neutralizes any sharp organic odors resulting from the heat-processing while the calcium carbonate balances the free fatty acids in the vegetable or animal fats contained in the treated food material, due to possible rancidity or other factors.

During the aforementioned heat-processing step, the cereal grains, such as hulled natural brown rice for example, are expanded approximately twice their normal size by reason of the generation and escape of steam from the grains and the dextrinization of substantially the entire starch content. The high heat employed kills and sterilizes the seed germ and renders the grain weevil-proof. The various ingredients of the mixture intimately agitated with the grains moreover impart thereto the desirable characteristics mentioned above.

After the completion of the heat-processing step at 1, as above outlined, the grains thus treated are cured and washed and during this latter step of the process, the grains are flaked and further expanded or puffed and all of the remaining free starch is abstracted therefrom. The curing operation, referring to Fig. 1, takes place at 2 and a suitable type of non-rusting, corrosion-proof tank or vat is employed into which the treated grains are placed. The tank is then filled with a relatively weak aqueous solution of sodium chloride of substantially 3 to 8° Baumé strength and the grains are permitted to soak in this solution for a period of from 8 to 10 hours, depending upon the cereal grain to be treated and depending also upon atmospheric moisture conditions. Due to the use of sodium chloride in the curing process, the specific gravity of the water is raised to such an extent that the remaining free starch abstracted from the grains remains in suspension and may thus be readily drawn off at the end of the curing operation. This starch may subsequently be recovered as a valuable by-product of the process by suitably evaporating the washing or curing solution. The sodium chloride solution further acts as a preservative and prevents the grains from souring during the curing step. It is sometimes advisable in hot weather, for example, to add to the curing solution one tenth of one per cent of sodium salicylate in order to prevent any tendency toward fermentation or oxidation.

As the grains become saturated in the curing tank, they swell and burst into a flaked condition and all of the undextrinized starch is abstracted and is maintained in suspension for subsequent recovery. After the grains have been subjected to the action of the saline solution for the period of time above indicated, they are thoroughly washed in order to remove any free starch adhering thereto and are then subjected to a drying treatment at 3, see Fig. 1.

At 3, the saturated and flaked grains are subjected to a relatively low temperature of the order of 140°–160° F. for a length of time, depending upon the material being processed. In the case of rice grains for example, the length of the drying operation is approximately two to three hours, it being pointed out that the drying is conducted slowly and proceeds to the point where the moisture content is reduced to substantially zero or to that which would correspond to the existing atmospheric conditions. Any suitable type dryer may be employed in this step of the process such as a flight dryer, shelf dryer, vacuum dryer or rotary dryer.

When the treated grains, as for example, natural brown rice, are dried as above stated, the finished product is in the form of a light brown, flaked substance which is approximately three to four times the size of the original grain. The finished product is moreover of a slightly puffed nature and rough in appearance. As has been heretofore stated, the product is exceedingly palatable when soaked and eaten with warm milk. On the other hand, the product keeps indefinitely because of the preserving qualities imparted thereto by the constituents of the mixture utilized in the heat-processing treatment and thus readily lends itself to packaging and distribution. In preparing the product other than in the manner above stated, the same may be boiled for a relatively short time interval, approximating three to five minutes and is then softened, thoroughly cooked, and in condition ready for eating. In the case of rice and other cereal grains, the material processed in accordance with the above, retains all of the essential food values including vitamins, mineral salts and other nutritious elements and, therefore, constitutes an exceedingly nourishing food.

Figure 4:
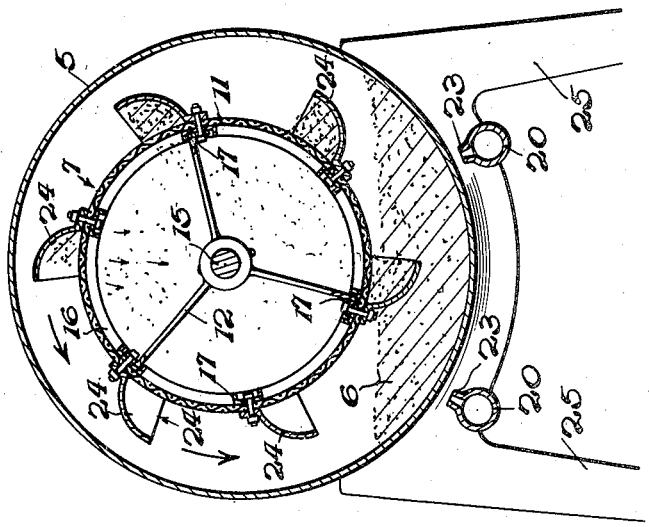
Fig. 4 is a sectional view of the mechanism of Fig. 1 and taken along lines 4—4 of the latter.
Figure 3:
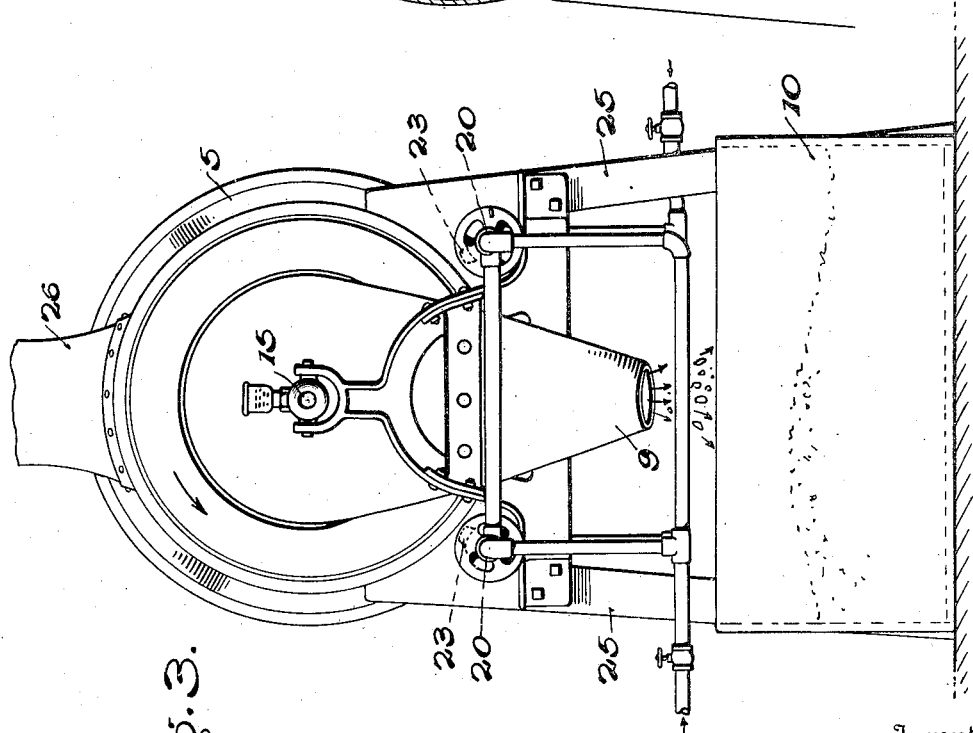
Fig. 3 is an end view of the mechanism of Fig. 2.

One desirable form of agitating oven which may be advantageously employed during the heat-processing of the food materials is illustrated in Figs. 2, 3 and 4. As shown therein, the same is of the rotary type and includes a tubular drum or tank 5 mounted with its axis in a substantially horizontal plane and adapted to contain a layer of the dry mixture constituting the heat transferring medium along the bottom thereof as at 6. A container 7 rotatably mounted within the tank 5 is adapted to be supplied with the material to be treated by means of a hopper 8 and chute 9, the latter communicating with one end of the container. The material is delivered from the opposite end of the container through a suitable delivery chute 9 into a suitable conveying apparatus 10.

In order that the granular heat transferring mixture 6 may be continuously supplied and agitated in commingled relation with the cereal grains or other food materials within the container 7, the latter is constructed of a foraminated sheet of metal or wire cloth material such as wire screening 11, the meshes thereof being of a size sufficient to prevent the passage therethrough of the material to be treated, while being sufficiently large to enable passage of the granular mixture which heat processes the food material. As shown, the container 7 includes a plurality of spiders 12, 13 and 14 which are fixedly secured to a shaft 15, the spiders having peripheral rim portions 16 which latter are secured together as by means of a plurality of supports 17 extending longitudinally of the member 7 from one end to the other. The screening material 11 may be thus assembled upon the framework, including supports 17 in any suitable manner.

In order to rotate the container 7, any suitable power means may be provided, such as for example, an electric motor 18, the shaft 18a of which is connected or geared with the shaft 15 as by means of a geared connection indicated generally at 19. Means are also provided for supplying a constant heat to the exterior of the tank 5 for the purpose of maintaining the material 6 at the desired temperature during the processing operation. Such means may comprise supply conduits 20 and 21 for conveying a combustible gas to a plurality of burners 23 and 22 respectively, positioned along the length of tank 5 and disposed substantially on opposite sides of the central portion thereof. Each of the group of burners 22 and 23 are disposed on either side of the vertical axis of the tank, see Fig. 3, in order to heat the material 6. Preferably the burners 22 and 23 are so adjusted that the former will impart a slightly higher heat to the material 6 than the latter, so that the material entering the container 7 will be subjected to a substantially decreasing heat as it passes through the container. In practice, it has been found that in heat-processing natural brown rice, excellent results are obtained by maintaining a temperature difference of substantially 75° F. between the burners 22 and 23. However, it will be understood that this temperature difference may be varied to suit the particular material to be processed.

The container 7 is provided with means for conveying the heated material 6 to the grains or other material in order that the latter may be heat-processed in the manner heretofore indicated during rotation of the container. As shown, the conveying means comprises a plurality of rounded scoops or cup-shaped members 24 suitably connected to the exterior of the container 7 as by connections with the supporting members 17. These cup-shaped members as indicated in Figs. 2 and 4 are arranged in a series of rows extending longitudinally of the container, and the construction is such that while the members are positioned closely adjacent each other in each row, the cup-shaped members in an adjacent row are staggered with respect to those in the first row so that during contact of each row of the members with the material 6, a supply of the latter will be assured. It will be understood from Fig. 4 that as the container 7 rotates in the direction of the arrow, the rounded cup-shaped members 23 will gather a supply of the material 6 and will drop the same through the meshes of the screen 11 into contact with the material within the container and be agitated with said material, thoroughly dispersed therethrough, and then sifted through the bottom of the container where it will fall to the bottom of tank 5 to be re-heated and conveyed again to the material to be processed. Thus the heated mixture is continuously mixed and agitated in close relationship with the cereal grains in order to perform the heat-processing heretofore outlined.

The tank 5 is suitably supported as by means of standards 25 and 26. The tank is moreover open to the atmosphere and is provided with a flue or stack 27 for conducting the vapors and steam generated during the processing operation to the atmosphere. Preferably a suitable temperature indicating device 28 is associated with heated material 6 and is accessible to the outside of the tank in order that the operator may observe the condition of the heat transferring medium. Any suitable arrangement may also be provided for adjustably raising and lowering the intake end of the container 7 to thus impart an inclination thereto for the purpose of obtaining a gravity feed of the treated material toward the delivery end. For example, a collar 29 may be adjustably secured to shaft 18a and adapted to contact a bracket 30. To adjust the intake end of the container, the set screw 31 is loosened whereupon the shaft 18a, connections 19 and the intake end of the container may be raised or lowered, after which the set screw is tightened. It will be understood that the intake end of the container is supported by the collar 29 and bracket 30.

While certain food materials have been heretofore mentioned in connection with the heat-processing step of the present invention, it is to be understood that these are for purposes of illustration only and are not to be taken as a limitation of the class or type of material which may be treated according to the invention disclosed herein. By way of further illustration it may be pointed out that pop corn may be popped during the heat-processing step in approximately thirty seconds, depending upon the temperature employed. Moreover many types of cereal grains, as well as legumes, such as soybeans, for example, may be treated in accordance with the heat-processing step of the present invention in order to prepare the same for subsequent use as a beverage ingredient, for flour, or for various other food uses. Furthermore, various types of grains may be treated in accordance with the complete process disclosed herein, and in the case of rice, for example, the process may be applied to the natural brown rice, as well as the polished rice which may be coated or uncoated.

It will be further understood that the invention is not limited to the form of agitating oven disclosed herein as various changes in the shape and construction of the parts thereof may be resorted to, as well understood by those skilled in the art, without departing from the spirit of the the invention. Reference will therefore be had to the appended claims for a definition of the limits of the invention.

What is claimed is:

1. The process of treating cereal grains which comprises dry-cooking the same for a period of approximately thirty to ninety seconds by continuously mixing therewith a dry granular mixture heated to a temperature of the order of 450° to 575° F., subjecting the grains for a period of from 8 to 10 hours to the action of a relatively weak solution of sodium chloride to flake the grains and abstract the free starch in said grains and hold the same in suspension, and subsequently removing the moisture from said grains by subjecting them to heat.

2. The process of treating cereal grains which comprises dry-cooking the same for a period of approximately thirty to ninety seconds by continuously mixing therewith a dry granular mixture heated to a temperature of the order of 450° to 575° F., subjecting the grains for a period of from 8 to 10 hours to the action of a relatively weak solution of sodium chloride to flake the grains and to abstract the free starch in said grains and hold the same in suspension, and thereafter reducing the moisture content of said grains by subjecting the same to the influence of a dry heat of relatively low temperature for a period of from two to three hours.

3. The process of treating cereal grains which comprises dry-cooking the same for a period of approximately thirty to ninety seconds by continuously mixing therewith a dry granular physical mixture of chemical compounds, approximately ninety to ninety-five per cent of the mixture being composed of salts of sodium, potassium and calcium, the said mixture being heated to a temperature of the order of 450° to 575° F., curing the dry-cooked grains in an aqueous solution for a length of time sufficient to enable bursting of the grains due to moisture absorbed from the solution, and drying the bursted grains.

4. The process of treating cereal grains which comprises cooking the grains at atmospheric pressure by mixing therewith a dry granular material heated to a temperature of the order of 450° to 575° F. for approximately thirty to ninety seconds, curing the cooked grains in an aqueous solution of sodium chloride for a length of time sufficient to enable swelling and bursting of the grains due to moisture absorbed from the solution, the latter serving to abstract the free starch from the grains and to hold the same in suspension, washing the bursted grains to remove the solution, and drying the grains thus treated.

5. The process of treating cereal grains which comprises dry-cooking the same at atmospheric pressure for a short period of time by continuously mixing therewith a dry granular physical mixture of chemical compounds, approximately ninety to ninety-five per cent of the mixture being composed of salts of sodium, potassium and calcium, the said mixture being heated to a temperature of the order of 450° to 575° F., soaking the grains in a weak aqueous saline solution for a period of time sufficient to cause swelling and bursting of the grains, washing the grains to remove the solution therefrom, and then subjecting the grains thus treated to the action of dry heat of a relatively low temperature whereby the contained moisture is slowly evaporated.

6. The process of treating cereal grains which comprises dry-cooking the same at atmospheric pressure by intimately associating therewith a dry granular mixture of chemical compounds heated to approximately 450° to 575° F., the chlorides of sodium and potassium constituting approximately ninety per cent of the mixture, bursting the grains thus treated by soaking them in an aqueous solution of sodium chloride, washing the grains, and drying the same to remove contained moisture.

7. The process of treating cereal grains, which comprises dry-cooking the same by continuously mixing therewith a dry granular physical mixture of chemical compounds heated to a temperature of the order of 450°–575° F., the physical mixture including salts of sodium, calcium and potassium, carbonates of calcium and magnesium, calcium phosphate and sulphate of iron, the said salts of sodium, calcium and potassium comprising approximately ninety to ninety-five per cent of the mixture, soaking the grains in an aqueous solution for a length of time sufficient to enable bursting and flaking of the grains due to absorbed moisture and subsequently drying the flaked grains.

8. The process of treating cereal grains, legumes, vegetables and other food materials which comprises dry-cooking the same by continuously mixing therewith a dry granular physical mixture of chemical compounds heated to a temperature of the order of 450°–575° F., the mixture comprising substantially 90 per cent of sodium chloride, approximately 3–5 per cent of potassium chloride, at least 3½ per cent of a mixture of calcium phosphate tribasic, sulphate of iron, lithium chloride, calcium carbonate and magnesium carbonate, the last named materials serving respectively as a color balancing agent, a preservative, an odor neutralizing material, an acid balancing agent and a moisture absorbing material, the remainder consisting of calcium chloride for preventing caking of the mixture.

9. The process of treating cereal grains, legumes, vegetables and other food materials which comprises dry-cooking the same by continuously mixing therewith a dry granular physical mixture of chemical compounds heated to a temperature of the order of 450°–575° F., the mixture consisting of the chlorides of sodium, calcium, potassium and lithium, carbonates of calcium and magnesium, calcium phosphate and sulphate of iron, the chloride of sodium comprising substantially 90 per cent of the mixture, approximately 3 per cent being constituted by the potassium chloride, and at least 3½ per cent by the calcium salts, the remainder including small percentages of iron sulphate, lithium chloride, and magnesium carbonate functioning respectively as a preservative, an odor neutralizing agent and as a moisture absorbing agent, the magnesium carbonate being burned off when the mixture is initially heated.

10. For use in quick-cooking cereal grains, legumes and other food materials, a dry granular mixture of chemical compounds comprising the chlorides of sodium, calcium, potassium and lithium, carbonates of calcium and magnesium, calcium phosphate and sulphate of iron, the sodium chloride comprising substantially 90 per cent of the mixture, approximately 3 per cent being constituted by the potassium chloride, and at least 3½ per cent by the calcium salts, the remainder including small percentages of iron sulphate, lithium chloride, and magnesium carbonate functioning respectively as a preservative, an odor neutralizing agent and as a moisture absorbing agent, the magnesium carbonate being burned off when the mixture is initially heated.

11. For use in heat-treating cereal grains, legumes, and other food materials, a dry granular mixture consisting of the following in substantially the proportions by weight as stated; sodium chloride 91.5–82.5%, potassium chloride 3–5%, calcium chloride 2–3.5%, calcium phosphate tribasic 1–2%, ferrous sulphate .5–1%, lithium chloride .5–1%, calcium carbonate .5–3%, and magnesium carbonate 1–2%.

12. For use in heat-treating cereal grains, legumes and other food materials, a dry granular mixture comprising substantially 90 per cent of sodium chloride, approximately 3–5 per cent of potassium chloride, at least 3½ per cent of a mixture of calcium phosphate tribasic, sulphate of iron, lithium chloride, calcium carbonate and magnesium carbonate, the last named materials serving respectively as a color balancing agent, a preservative, an odor neutralizing material, an acid balancing agent and a moisture absorbing material, the remainder consisting of calcium chloride for preventing caking of the mixture.

13. The process of treating unhulled rough rice having no more than its natural moisture content which comprises continuously sifting through the rice and agitating therewith, a dry granular mixture of chemical compounds heated to a temperature of the order of 450°–575° F. to cause the steam generated within the rice hulls to pop the rice grains.

14. The process of treating cereal grains which comprises agitating the same in intimate contact with a dry granular material heated to a temperature of the order of 450° to 575° F., curing the dry heated grains in an aqueous solution for a length of time sufficient to enable bursting and flaking of the grains due to moisture absorbed in the solution, and subsequently drying the flaked grains.

15. The process of treating food materials which comprises dry-cooking the same by continuously mixing therewith a dry granular material heated to a temperature of the order of 450° to 575° F., the material consisting of the following in substantially the proportions by weight as stated: sodium chloride 91.5–82.5%, potassium chloride 3–5%, calcium chloride 2–3.5%, calcium phosphate tribasic 1–2%, ferrous sulphate .5–1%, lithium chloride .5–1%, calcium carbonate .5–3%, and magnesium carbonate 1–2%.

LOGAN A. DILS.